(12) United States Patent
Thober et al.

(10) Patent No.: US 12,137,159 B2
(45) Date of Patent: Nov. 5, 2024

(54) ENCRYPTION KEY DISTRIBUTION VIA WIRELESS MOBILE DEVICES TO INTERNET OF THINGS (IoT) SYSTEMS

(71) Applicant: Centro de Pesquisas Avancades Wernher von Braun, Campinas-SP (BR)

(72) Inventors: Dario Sassi Thober, Campinas (BR); Diogo Oliveira De Melo, São Carlos (BR); Jorge Anthony Félix Herrera, São Carlos (BR)

(73) Assignee: CENTRO DE PESQUISAS AVANCADES WERNHER VON BRAUN (BR)

( * ) Notice: Subject to any disclaimer, the term of this patent is extended or adjusted under 35 U.S.C. 154(b) by 273 days.

(21) Appl. No.: 17/821,505

(22) Filed: Aug. 23, 2022

(65) Prior Publication Data

US 2024/0072993 A1    Feb. 29, 2024

(51) Int. Cl.
*H04L 9/08*    (2006.01)
*H04L 9/14*    (2006.01)
(Continued)

(52) U.S. Cl.
CPC ............ *H04L 9/0819* (2013.01); *H04L 9/14* (2013.01); *H04W 12/0431* (2021.01); *H04W 12/0433* (2021.01); *G16Y 30/10* (2020.01)

(58) Field of Classification Search
CPC ........ H04L 9/0819; H04L 9/14; H04L 63/06; H04L 2209/80; H04L 2209/805;
(Continued)

(56) References Cited

U.S. PATENT DOCUMENTS 9,716,595 B1    7/2017    Kravitz et al.
9,775,028 B2    9/2017    Zhang et al.
(Continued)

FOREIGN PATENT DOCUMENTS

EP    3468133    7/2017
WO    2017058110    4/2017
WO    WO-2021164769 A1 *    8/2021    .............. H04B 7/00

OTHER PUBLICATIONS

Solano et al., "One-Time URL: A Proximity Security Mechanism between Internet of Things and Mobile Devices", 2016 (Year: 2016).*

(Continued)

*Primary Examiner* — John B King
(74) *Attorney, Agent, or Firm* — Jon Gibbons; Fleit Intellectual Property Law (57) ABSTRACT

A wireless mobile device, and a computer-implemented method of distributing encryption keys to Internet of Things (IoT) systems begins with the wireless mobile device requesting IoT systems keys from a key management system with a first radio transceiver. Next, the requested IoT systems keys are received. Each of the IoT systems keys is i) encrypted with a public key from a recipient IoT system, and ii) signed by the key management system. In response to the wireless mobile device being located in proximity to the recipient IoT system, identifiers of the IoT system are received by the wireless mobile device with a second radio transceiver. The wireless mobile device selects at least one of the IoT systems keys that corresponds to the identifiers. The IoT system keys are transmitted from the wireless mobile device to the recipient IoT system with the second radio transceiver.

16 Claims, 6 Drawing Sheets

(51) Int. Cl.
*H04W 12/0431* (2021.01)
*H04W 12/0433* (2021.01)
*G16Y 30/10* (2020.01)

(58) Field of Classification Search
CPC .............. H04L 9/083; H04W 12/0431; H04W 12/0433; H04W 12/00; H04W 12/04; H04W 12/041; G16Y 30/10; H02J 50/001
See application file for complete search history.

(56) References Cited

U.S. PATENT DOCUMENTS

| | | | |
|---|---|---|---|
| 9,860,221 B2 | 1/2018 | Smith | |
| 9,876,823 B2 | 1/2018 | Smith et al. | |
| 9,923,715 B2 | 3/2018 | Smith | |
| 10,171,462 B2 | 1/2019 | Britt et al. | |
| 10,219,152 B2 | 2/2019 | Muhanna et al. | |
| 10,411,898 B2 | 9/2019 | Liu et al. | |
| 10,623,497 B2 | 4/2020 | Thaler et al. | |
| 10,666,432 B2 | 5/2020 | Mishli et al. | |
| 10,868,689 B2 | 12/2020 | Lo et al. | |
| 10,887,295 B2 | 1/2021 | Muhanna et al. | |
| 10,959,092 B2 | 3/2021 | Sharma et al. | |
| 11,115,193 B2 | 9/2021 | Wei et al. | |
| 11,664,977 B2* | 5/2023 | Shaw | H04W 72/51 380/44 |
| 2008/0298595 A1* | 12/2008 | Narayanan | H04W 12/06 380/278 |
| 2010/0211507 A1 | 8/2010 | Aabye et al. | |
| 2016/0337346 A1* | 11/2016 | Momchilov | G06F 21/34 |
| 2016/0358186 A1* | 12/2016 | Radocchia | G06Q 30/018 |
| 2017/0034700 A1 | 2/2017 | Cohen et al. | |
| 2018/0262907 A1 | 9/2018 | Alanis et al. | |
| 2020/0019693 A1* | 1/2020 | Zhao | G06F 21/43 |
| 2020/0053079 A1* | 2/2020 | Bendersky | H04L 9/14 |
| 2020/0126058 A1* | 4/2020 | Mars | G06Q 20/40145 |
| 2020/0244671 A1 | 7/2020 | Nagata et al. | |
| 2020/0250908 A1* | 8/2020 | Shah | H04L 9/0897 |
| 2020/0349547 A1 | 11/2020 | Sassi Thober et al. | |
| 2021/0044972 A1 | 2/2021 | Murray | |
| 2021/0209237 A1* | 7/2021 | Gurin | H04L 9/14 |
| 2021/0266302 A1 | 8/2021 | Daly | |
| 2021/0398371 A1* | 12/2021 | De La Garza | G07C 9/00571 |
| 2022/0038265 A1 | 2/2022 | Shaw | |

OTHER PUBLICATIONS

Orieb Abualghanam, "A Survey of Key Distribution in the Context of Internet of Things", Journal of Theoretical and Applied Information Technology, Nov. 30, 2019, pp. 3217-3241, vol. 97, No. 22, JATIT, Islamabad, Pakistan.

Mohanad Al-Hasanat, et al., "A Physical-Layer Key Distribution Mechanism for IoT Networks", Mobile Networks and Applications, Feb. 2020, Springer, Berlin, Germany.

Maissa Dammak, et al., "Decentralized Lightweight Group Key Management for Dynamic Access Control in IoT Environments", pp. 1-15, IEEE Transactions on Network and Service Management, IEEE, New York, NY.

Yi-Hsuan Kung and Hsu-Chun Hsiao, "GROUPIT: Lightweight Group Key Management for Dynamic IoT Environments", IEEE Internet of Things Journal, Dec. 2018, pp. 5155-5165, vol. 5, No. 6, IEEE, New York, NY.

Mahalle, Parikshit N., et al., "Threshold Cryptography-based Group Authentication (TCGA) Scheme for the Internet of Things (IoT)", Published in: 4th International Conference on Wireless Communications, Vehicular Technology, Information Theory and Aerospace & Electronic Systems (VITAE), 2014, IEEE, New York, NY.

Luca Veltri, et al., "A novel batch-based group key management protocol applied to the Internet of Things", Ad Hoc Networks, 2013, pp. 1-14, Elsevier, Amsterdam, Netherlands.

* cited by examiner

ENCRYPTION KEY DISTRIBUTION VIA WIRELESS MOBILE DEVICES TO INTERNET OF THINGS (IoT) SYSTEMS

BACKGROUND

The present invention generally relates to the facilitation of data exchange through a digital network marketplace and, more specifically, to encryption key distribution in contactless payment systems using wireless mobile devices.

The use of contactless payment systems continues to increase. The Covid-19 pandemic further increased demand for contactless payment systems used with tolls, parking lots, gas stations and other Internet of Things (IoT) systems.

For example, many transit routes and electronic toll systems use identification mechanisms based on wireless technologies, such as radio-frequency identification (RFID) and Bluetooth®, to exchange data between fixed IoT access points and wireless mobile devices. Identity data is sent in encrypted form to IoT systems installed on roads.

It is common for a fixed IoT access point or reader to be positioned at a toll portal, at an entrance to a parking lot or at a drive-through facility such as a gas station. A vehicle (or a wireless mobile device within the vehicle) wirelessly transmits an identification signal to pay for a service. Known IoT systems must receive the identification signal that identifies the vehicle. Only an identifying data (ID) in the identification signal is wirelessly transmitted to the reader. ID reading equipment decodes the identification signal emitted by the vehicle (using a set of previously system-defined encryption keys. The set of encryption keys must be present in a memory of the ID reading equipment when an identification process begins, the set of encryption keys being updated on a few-days basis.

Known solutions use a central repository to store the set of encryption keys. The encryption keys are used to decode the readings from the IoT systems. Because known solutions purport to handle several external payer services such as insurance companies, toll management providers, gas station franchises, etc., it is desirable to aggregate these entities according to their function, geographical proximity or another aggregable parameter. For this reason, the concept of "group" was developed to improve the key distribution algorithms. For example, it is possible to assign a group for a given franchise or a given city area. The set of encryption keys may be identified using a key set identifier ID. With known solutions, encryption keys are distributed via the Internet or, more typically, through an internal communication infrastructure of a company that provides a service such as a toll road, vehicle parking, gas station, or restaurant. Encryption keys are then transferred to the IoT access point to be ready to decode customers transaction data. With known solutions, the distribution of encryption keys disadvantageously depends on a custom or private communication infrastructure to deliver the encryption keys to the IoT system. This custom or private communication infrastructure requirement limits deployment of IoT systems and adds costs.

SUMMARY

The present invention removes the requirement for dedicated communication infrastructure required in the distribution of encryption keys to IoT systems. The present invention expands the capacity and speed of updating information used in IoT systems, such as secure identification systems. The present invention uses a smartphone or another enabled wireless mobile device such as a smartwatch, within which dedicated applications are installed, that compounds the identification and interaction system with payments currently in use as in toll applications.

More specifically, disclosed is a wireless mobile device and computer-implemented method of distributing encryption keys to IoT systems. The method begins with requesting IoT systems keys from a key management system with a first radio transceiver. In one example, the request includes the location of the smartphone. Next, the requested IoT systems keys from the key management system are received. The IoT system key may include a key set identifier ID. The key set identifier ID logically categorizes encryption keys based on the geographic location of the recipient IoT system, a type of service, expiration dates, and other categories. Each of the IoT systems keys is i) encrypted with a public key from a recipient IoT system, and ii) signed by the key management system. Optionally, the IoT system keys may also include a validation purpose start date/time field and an expiration date/time field. The IoT system keys are symmetrical keys, asymmetric keys, or a combination of both. Examples of IoT systems include, but are not limited to a toll booth, a parking area, a gas pump and a restaurant.

In response to the wireless mobile device being located in proximity of the recipient IoT system, IoT system identifiers are received with a second radio transceiver. The wireless mobile device selects at least one of the IoT systems keys from the wireless mobile device that corresponds to the IoT system identifiers. The IoT system keys are transmitted from the wireless mobile device to the recipient IoT system with the second radio transceiver.

BRIEF DESCRIPTION OF THE DRAWINGS

In the accompanying figures, like reference numerals refer to identical or functionally similar elements throughout the separate views. The accompanying figures, together with the detailed description below, are incorporated in and form part of the specification and serve to further illustrate various embodiments and to explain various principles and advantages, all in accordance with the present invention, in which.

DETAILED DESCRIPTION

Disclosed is a system and method that provides encryption key distribution via a wireless mobile device to Internet of Things (IoT) enabled systems. A wireless mobile device, such as a smartphone, includes at least features of i) location, ii) wireless cellular communication, iii) Bluetooth, or other wireless technology used to exchange data between fixed IoT access points and mobile devices, iv) support for applications, referred to as a virtual tag software application, and v) a smartphone reading system. A user's smartphone identifies the user and the vehicle to a payment system. Encryption keys and protocols used in accordance with the invention are compatible with existing IoT systems, key repository systems or key management systems. The payment system that uses this key distribution method can be applied to highways tolls, self-services, gas stations, restaurants, and all types of applications requiring secure identification and/or payment. The payment system requires identification of the user and/or the vehicle.

The present invention removes a need for a dedicated communication infrastructure to distribute the encryption keys to IoT systems. The present invention expands the capacity and speed of updating information used in IoT systems, such as secure identification systems. The present invention uses smartphones and other wireless devices such as smartwatches with dedicated applications installed that compound the identification and interaction system with payments currently in use as in toll applications.

Non-Limiting Definitions

The terms "a", "an" and "the" are intended to include the plural forms as well unless the context clearly indicates otherwise.

The phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The terms "comprises" and/or "comprising", when used in this specification, specify the presence of stated features, steps, operations, elements, and/or components but do not preclude the presence or addition of one or more other features, integers, steps, operations, elements, components, and/or groups thereof.

The term "configured to" describes the hardware, software, or a combination of hardware and software that is adapted to, arranged, built, composed, constructed, designed, or that has any combination of these characteristics to perform a given function. The term "adapted to" describes the hardware, software, or a combination of hardware and software that is capable of, able to accommodate, to make, or that is suitable to perform a given function.

The term "coupled," as used herein, is defined as "connected," although not necessarily directly and not necessarily mechanically.

The term "digital signature" is a mathematical algorithm for verifying the authenticity of a digital message, and it is typically used to prevent forgery or tampering.

The term "encryption key" is a piece of information, usually a string of alphanumeric numbers, which, when processed through a cryptographic algorithm, can encode or decode cryptographic data. The encryption key may be symmetric or asymmetric, and its security strength depends on the algorithm, size or length of the key, the generation of the key, and the process by which the key is exchanged.

The term "hash function" is a mathematical algorithm that turns an arbitrarily-large amount of data into a fixed-length size. The same hash will always result from the same data, but modifying the data by even one bit will completely change the hash. The values returned by the hash function are called a "hash".

The term "identifier" is a unique identifier assigned to IoT devices or to a network interface associated with the IoT device used as a network address. Examples of identifiers include media access control (MAC) address, burned-in address, Ethernet hardware, hardware address, or physical address.

The terms "including" and "having," as used herein, are defined as comprising (i.e., open language).

The term "key set identifier ID" or "group identifier" is used to logically categorize a group of encryption keys. The categorization may be based on geographic location, a type of service, e.g., tolls, parking, restaurants, expiration dates or other categories as typically assigned by the key management system.

The term "reading equipment" is an electronic device that connects with the road's equipment or other vendor's equipment, e.g., parking lots, gas pumps, cash registers, interacting and controlling gates or other physical elements present. With the present invention, a smartphone can act as a reading equipment by implementing a part of or the whole equipment functionality via installed solution software. Group keys, needed to decode the envelope of messages coming from the smartphone, are transmitted from smartphones to road equipment or payment devices in an analogous form as traditional RFID reading equipment, for example.

The term "virtual tag" is software installed on a smartphone to act as a smart card to control access to a resource. The virtual tag can provide personal identification, authentication, data storage, and application processing. Applications include identification, financial, mobile phones with a subscriber identity module (SIM), public transit, computer security, schools and healthcare.

The term "wireless mobile device" is any wireless device, such as a smartphone, smartwatch, tablet computer, laptop computer) that includes features of location determination, wireless cellular communication, and Bluetooth or other short-range wireless communication. Some wireless mobile devices may electronically couple with an automotive telematics system to provide some of these features.

Private Network Encryption Key Distribution

Figure 1:
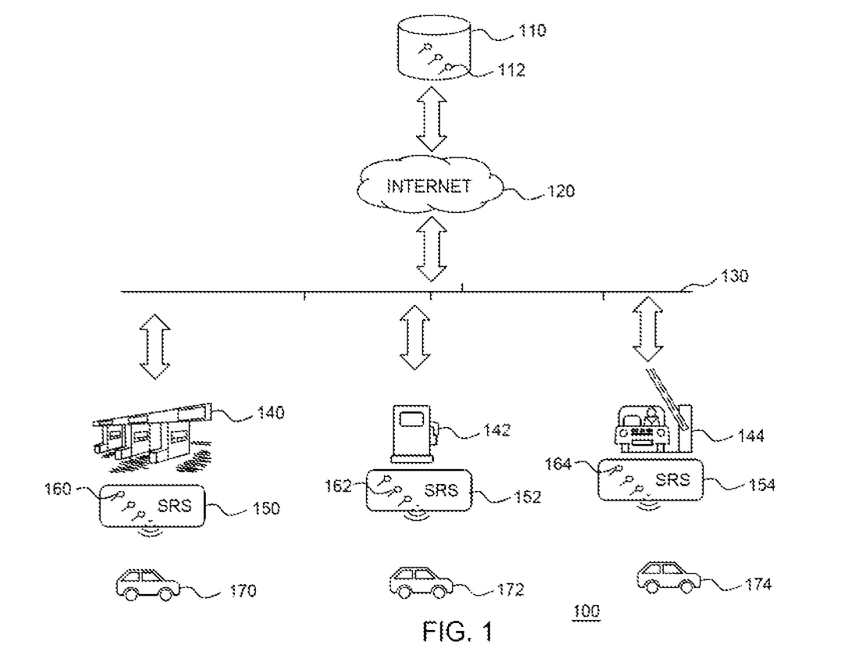
FIG. 1 is a known solution for encryption key distribution, in accordance with the prior art.

FIG. 1 illustrates a known solution 100 to distribute encryption keys in a vertical and hierarchical manner. Starting from the top, shown is a key repository or key management system 110 that holds a plurality of encryption keys 112. The key management system is located in the backend of the system in accordance with the invention, being part a centralized repository that manages the sets of keys used by the whole solution, including the key's updating and distribution. The key management system 110 must be updated, especially when new batches of identification elements (RFID tags, virtual tags, etc.) are deployed to users or to automobiles 150.

More specifically, known solutions use a key management system 110 to store the encryption keys 112. These encryption keys 112 are transferred through the Internet 120 over a custom or private communication infrastructure 130 to reside in reading systems associated with IoT devices 140, 142, 144. These reading systems, in one example, are compatible with smartphone reading systems. These reading systems decode readings 170, 172, 174 when using services with IoT devices 140, 142, 144. For example, an IoT device may be used with a road access point infrastructure for collecting highways tolls 140, with a gas station 142, with an entrance to a parking lot 144, with any self-service facility, with a restaurant and with all types of applications requiring secure identification and/or payment. With known solutions, the encryption keys 160, 162, 164 may be categorized into groups using their key set identifier ID. With known solutions, the distribution of the encryption keys 112 disadvantageously depends on installation of the custom or private communication infrastructure 130 to provide a necessary communications infrastructure to deliver the encryption keys 112 to the IoT system. This communication infrastructure requirement adds costs and limits deployment of known IoT systems.

Smartphone Encryption Key Distribution

Figure 2:
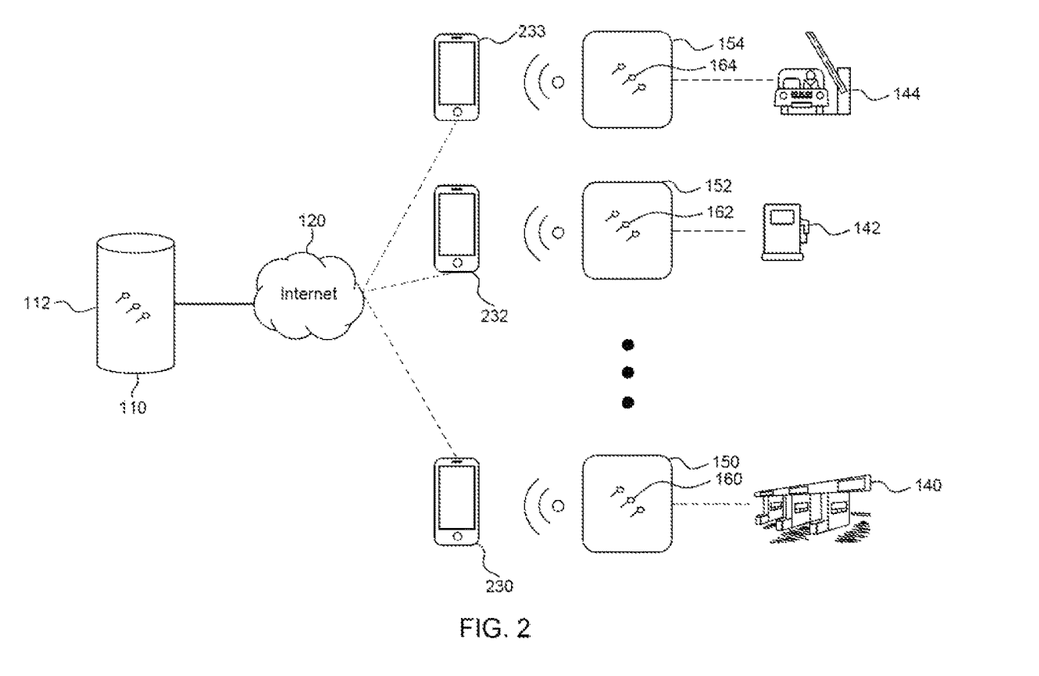
FIG. 2 illustrates is an encryption key distribution process via a user's smartphone directly from the Internet, according to the invention.

Turning now to FIG. 2, illustrated is an encryption key distribution process via the user's smartphone 230, 232, 234 directly from the Internet, according to the present invention. The smartphone reading system (SRS) 150, 152, 154 in accordance with the invention, no longer needs to interact with a backend system or key management system 110. For brevity, the like reference numerals refer to identical or functionally similar elements as described in FIG. 1 above. In FIG. 2, the custom or private communication infrastructure 130 of FIG. 1 is eliminated. A system and method in accordance with the invention are now described to replace the custom or private communication infrastructure 130 of FIG. 1 for encryption key distribution.

Disclosed is a system and method for distributing the encryption keys used by the identification and secure collection system to decrypt encrypted messages from a virtual tag application running on the user's smartphone. The distribution of encryption keys is no longer limited by information systems of the custom or private communication infrastructure 130 that support the identification and collection operations on a transit route. Instead, the present invention distributes encryption keys using the capabilities of the user's wireless mobile device. The present invention establishes a secure data transfer channel using the wireless mobile device by establishing direct communication with an IoT device 140, 142, 144. The SRS 150, 152, 154 accordance with the invention obtains the encryption keys 160, 162, 164.

The disclosed encryption key distribution method is based on using a smartphone network for the secure identification system disclosed herein, comprises hardware and software, and is an improvement over known smartphone reading systems (SRSs). The SRS 150, 152, 154 that uses the encryption key distribution method in accordance with the invention performs the same interaction operations with elements in the custom or private communication infrastructure 130 as the known SRS in FIG. 1 performs. A difference is that the SRS 150, 152, 154 accordance with the invention is no longer dependent on the encryption key distribution services used in known SRSs. The encryption keys 112 are, as previously mentioned, directly provided by the user's smartphone 230, 232, 234 at the time of a transaction or by the proximity of SRSs 150, 152, 154 to which messages are sent. Advantageously, the SRS 150, 152, 154 accordance with the invention can also make use of existing known SRSs.

An overview of the process is as follows. When a smartphone 230, 232, 234 is in proximity to communicate using near-field communication with the SRS 150, 152, 154 of IoT device 140, 142, 144, the smartphone requests encryption keys 112 from the key management system 110 over a cellular network. An authentication routine, such as sending the request signed by the smartphone or SRS public key, may be used. In another example, the request is sent using a secure protocol, such as hypertext transfer protocol secure (HTTPS), to the key management system 110. In one example, the requesting of encryption keys 112 from the key management system 110 occurs asynchronously with being near the SRS 150, 152, 154. The request from the smartphone 230, 232, 234 to the key management system 110 is performed using a representational state transfer (REST) application programming interface (API) with authentication. The smartphone 230, 232, 234 requests the encryption keys 112 and stores them, potentially for several hours/days. When the smartphone 230, 232, 234 is within wireless range (typically a few meters) to an SRS 150, 152, 154, the smartphone identifies the SRS and sends the requested encryption keys 112 to the SRS. Next, the requested encryption keys 112 are sent from the key management system 110 to the smartphone 230, 232, 234. The requested encryption keys 112 are then sent using Bluetooth, near-field communication or short-range wireless communication protocols, to the SRS 150, 152, 154 associated with the IoT device 140, 142, 144. This completes a high-level view of an encryption key distribution transaction.

This mechanism provides an expansion in the field of identification and services that may include payment systems. The transmission of messages from the key management system 110 to the SRS 150, 152, 154 is done directly through the smartphone 230, 232, 234 or similar device. In this way, distribution of the encryption keys is carried out without the intervention of the custom or private communication infrastructure 130 and, consequently, without limiting the scope of applications to traffic routes, thereby expanding the performance to other services such as gas stations, restaurants, and other self-services. Advantageously, the improved method of encryption key distribution in accordance with the invention relieves the infrastructure of the need for Internet connectivity for encryption key synchronization.

The encryption key distribution method in accordance with the invention includes the following elements that represent an improvement known existing systems:

The encryption keys, used to decode messages generated by systems based on RFID, Bluetooth or Wi-Fi®, no longer need to be captured and transmitted by the IoT service providers or other entities that provide the product/service paid with the virtual tag. The SRS 150, 152, 154 manages the interaction between the smartphone 230, 232, 234 and the road equipment (gates, electronic gates, access, among others). The requested encryption keys 112 are transmitted from a key repository or key management system 110 to the smartphone 230, 232, 234, over the Internet 120 or cellular networks, and from the smartphone to the SRS 150, 152, 154, through wireless communication, such as near-field communications. Typically, these two communications occur at different times, which allows the distribution of keys to regions where there is no Internet 120 available for the user's smartphone 230, 232, 234.

Asymmetric cryptography is used to ensure that i) the messages generated by the key management system 110 are only decrypted by the SRS 150, 152, 154 receiving the communication, and ii) the SRS 150, 152, 154 has a guarantee that the message was in fact issued by the key management system 110.

The key management system 110 generates messages for the different SRSs 150, 152, 154, and transmits over Internet 120 to smartphones, or similar devices, which make up the ubiquitous network of encryption key distribution. These devices, in turn, relay these keys to the SRSs 150, 152, 154, as they are physically close to them. The key management system 110 calculates, based on the geographical positions of smartphones 230, 232, 234 and SRSs 150, 152, 154, which smartphones should carry messages for which SRSs.

Disclosed is an improved method that comprises software and hardware components to securely manage identification and payment transactions originated by the user's smartphone or similar device. Among the components are:

a secure mechanism for managing keys and pertinent data in applications.

an element for communication with IoT device 140, 142, 144.

software systems with security to access the requested encryption keys 112.

Key Management System or Backend System

The backend system, in one example, includes an optional eHook security element to indicate the smartphone's proximity to the element for communication with the IoT device 140, 142, 144.

The optional eHook security element is a physical wireless device, installed near a road or parking lot, that sends its own identification data (along with other data on payload) encrypted using its assigned ID key set identifier. The optional eHook security element is mainly used to help a software activation cycle of the smartphone 230, 232, 234 to avoid unnecessary battery usage when the user or the vehicle is in route. When a smartphone 230, 232, 234 sends a virtual tag signal, it includes the eHook's encrypted block, as proof that the smartphone 230, 232, 234 was indeed in proximity with that eHook security element. See Brazilian patent application number BR102018067975A2 entitled "System For The Identification And Tracking Of Loads And Objects In General Based On Wireless Communication Signal Generator And Mobile Network Infrastructure," which is commonly assigned herewith and is incorporated by reference in its entirety. A set of encryption key IDs is used to select a set of symmetric keys depending on the proximity of the SRS 150, 152, 154 to the IoT system (toll, gas, parking). Each SRS 150, 152, 154 has a set of symmetric keys. Step i) When a smartphone 230, 232, 234 is carrying a package from the key management system 110 to the SRS 150, 152, 154 that package contains many keys for the SRS to use not only with the smartphone but potentially with other devices as well. Step ii) When a smartphone 230, 232, 234 is using the system (e.g., attempting to pay for gas), the smartphone sends its identification encrypted with one of the group keys (symmetric encryption). Step iii) The SRS 150, 152, 154 then looks up which key set identifier ID that the smartphone is referencing and uses the encryption key from that key set identifier ID to decrypt the communication. Step iii) is further described in U.S. patent application Ser. No. 16/855,426, filed Apr. 22, 2020, entitled "Secure Identification System Using Smartphones", which is commonly assigned herewith, and incorporated by reference in its entirety. The key set identifier ID is used to identify the encryption key. Even though a group has only one encryption key, many smartphones may belong to the same group.

A secure mechanism for storing and exchanging encryption keys and other sensitive data serves to protect the application against digital thieves and device cloning. The secure mechanism allows the mentioned encryption keys to be transported inside the user's smartphone to be used at the time of the transaction and/or for future transactions, thereby not allowing their reading or manipulation by the user of the smartphone or by a third party.

Sequence Diagram

Figure 3:
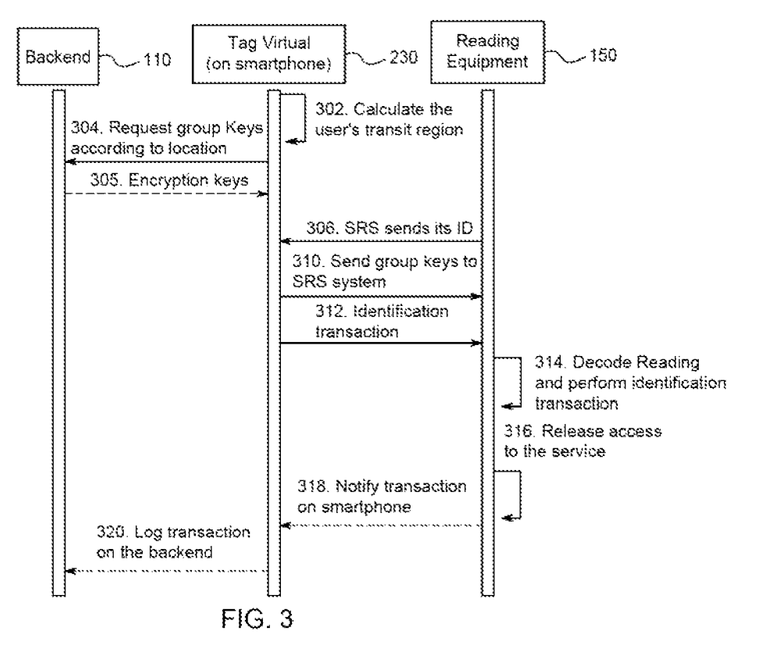
FIG. 3 illustrates a sequence diagram summarizing actions of FIG. 2, according to the invention.

FIG. 3 illustrates a sequence diagram summarizing actions of FIG. 2, according to the invention. For brevity, the like reference numerals refer to identical or functionally similar elements described in FIG. 2 above. In response to the smartphone 230, 232, 234 being in communication proximity with SRS 150, 152, 154 a process of sending encryption keys begins. The identification of the SRS 150, 152, 154 is sent from the smartphone 230, 232, 234 to the backend or key management system 110. The virtual tag, including the element that executes the encryption key distribution method as described with the invention based on the ubiquitous network for secure identification system. Steps 302 to 310 are for the sole purpose of passing on the keys from the key management system 110 to the SRS 150, 152, 154 without necessarily performing any transaction.

The flow begins in step 302, at which step a location or a transit region of a smartphone 230 is calculated. The location of the smartphone 230 can be calculated by the cellular network using multilateration of radio signals between several cell towers and the smartphone, or by the smartphone itself using the global positioning system (GPS) or another global navigation satellite system (GNSS). The process continues to step 304. In step 304, the smartphone 230 requests a group of encryption keys 112 from the key management system 110. In one example, there is an authentication step 305 in which the key management system 110 authenticates the smartphone using either public-private key or symmetric key encryption or digital signatures, or both, using a secure or unsecured cellular communication protocol. The process continues to step 306. In step 306, the key management system 110 sends, over the cellular communications network, the requested encryption keys 112.

Steps 302 to 305 may be performed without the smartphone 230 being within proximity of the reading equipment 150. In contrast, the smartphone 230 is within proximity of the reading equipment 150 to perform steps 306 to 318. In step 306, the reading equipment or SRS 150 sends, using near-field communication, its identifier to the smartphone 230. The identifier can be any identifier typically used as a network address. The process continues to step 310. In step 310, the smartphone 230 selects and sends a group of encryption keys 160 based on the identifier received from the reading equipment 150. In one example, to enhance security, the encryption keys 160 are encrypted with a public or symmetric key of the reading equipment 150. In another example, the encryption keys 160 are a subset of the requested encryption keys 112 sent from the key management system 110 to the smartphone 230.

Process steps 312 through 320 are typically only performed when there is an external service transaction, such as paying a toll for a toll road, purchasing goods or services at a store, or purchasing fuel. Starting with step 312, the smartphone 230 includes software, such as software to act as a virtual tag, to communicate with the SRS 150, 152, 154 using near-field communication. In step 312, the smartphone 230 sends an identifier, using near-field communication, to the reading equipment 150. The identifier is unique to the user of the smartphone 230. The identifier may be generated as a logical identifier when the service is installed on the smartphone and also use hardware identifiers from the smartphone, such as an equipment identification number. For security reasons, the type of identifier is encrypted with a symmetric or asymmetric encryption key. The reading equipment 150 decodes the encrypted identifier in step 314. Next, in step 316, the reading equipment 150 sends, using near-field communication, an acknowledgment that the transaction is completed. The smartphone 230, in turn, sends, using cellular communication, the acknowledgment to the key management system 110. Steps 318 and 320 occur when there is an identification of the smartphone in the reading equipment 150, but these two steps are not essential for the transaction itself because the transaction is processed by the service provider or concessionaire's road computer or point of service (PoS) such as a drive-through facility or a gas station.

The virtual tag system comprises software that encapsulate the mechanisms and the access to the encryption keys necessary to perform a secure transaction through the encryption key distribution method based on smartphone network for secure identification systems. Therefore, encryption key distribution no longer requires dedicated distribution networks. The encryption keys are directly used at the time of the transaction in an SRS-virtual tag system interaction. One portion of the virtual tag system is the virtual tag application located in the smartphone. Another portion of the virtual tag system comprises the road/parking reading systems and the system backend.

The backend system comprises services that supports the operations of the virtual tag application in the user's smartphone, one of these elements/services being the key management system 110. The backend system stores, among other data, the group encryption keys to be used by all SRSs installed in the field, and also the encryption keys that are used by smartphones.

The optional eHook security element is present at strategic locations such as close to a toll road access point or a site of a payment service, and the optional eHook security element indicates to the smartphone 230, 232, 234 its proximity to an SRS 150, 152, 154 in operation. The optional eHook security element serves two purposes: 1) provide a safe scheme to indicate the places where there are services that can be accessed through the virtual tag, and 2) when providing the indication of the proximity of this type of location, the smartphone 230, 232, 234 efficiently changes from a state of "waiting" to a state of "alert" thus preventing unnecessary power consumption of the smartphone.

The identification process happens according to the following description or general algorithm:

Each SRS 150, 152, 154 in the road infrastructure has a pair of asymmetric keys for its access to the backend system of the virtual tag system. A private key is securely stored in the IoT system, and a public key is registered in the backend system of the virtual tag system.

The virtual tag system in a memory of the smartphone 230, 232, 234 sends a request to the backend system, the same request that already has geolocation information. With such information, the backend system decides which set of encryption keys for the SRSs within the operating range should be provided to the smartphone 230, 232, 234 as an answer. The backend system returns the relevant information, including the set of group keys in an encrypted manner, which is then be passed on to the SRS (or a group of SRSs) that is at that time or at a future time, interacting with the virtual tag system.

The virtual tag system present on the smartphone 230, 232, 234 receives a set of packages, each package containing the group keys for a given SRS.

Each package is encrypted using asymmetric encryption. Encryption is performed using the public key of the target equipment that acts according to the encryption key distribution method based on the smartphone network for secure identification systems.

Each package contains a key management system signature made with the private key of the backend system.

The package includes, among other items, the following elements:

Key set identifier ID.
  Key validity:
  Date/time of validity start.
  Expire date/time.
  In one example, the key is a symmetric key for the group in the Advanced Encryption Standard (AES) format.

Each SRS 150, 152, 154 broadcasts an identifier with a wireless transmitter for reception by each smartphone 230, 232, 234 within range of each SRS. In an optional example, when the user's smartphone is in an area of interest (for example, toll booth, parking entrance, drive-through entrance), the proximity to the installed optional eHook security element indicates that the user must initiate an interaction offer with the SRS. In another optional example, each SRS 150, 152, 154 has a geolocation associated with its installed location. When the smartphone 230, 232, 234 communicates with the key management system 110 and sends its geolocation, the smartphone might be, for example, 10 km from the SRS, and then the key management system sends a package to that SRS based on the installed location of that SRS and the geolocation of the smartphone.

When the smartphone 230, 232, 234 detects the presence of the SRS (Bluetooth Low Energy (BLE)-Bluetooth), then it can send the data to that SRS in particular.

When the user's smartphone 230, 232, 234 is in the area of interest, the user's smartphone begins to deliver packages of keys, received from the backend system of the virtual tag system, to the recipient SRSs.

In addition to its identifier, the virtual tag passes its date/time to the SRS for the following purposes:
  Perform adjustment of a clock after eventual restart of equipment.
  Correct drift of the clock caused by inaccuracy in a crystal oscillator used for control of a real-time clock present in the equipment.

The SRS 150, 152, 154 does not allow the clock to be adjusted to a value with a deviation greater than that expected by correcting the drift to avoid possible fraud attempts.

During the transaction between the virtual tag system on the smartphone 230, 232, 234 and the SRS 150, 152, 154, the process begins with an initiation message with data required to perform the identification process.

Figure 4:
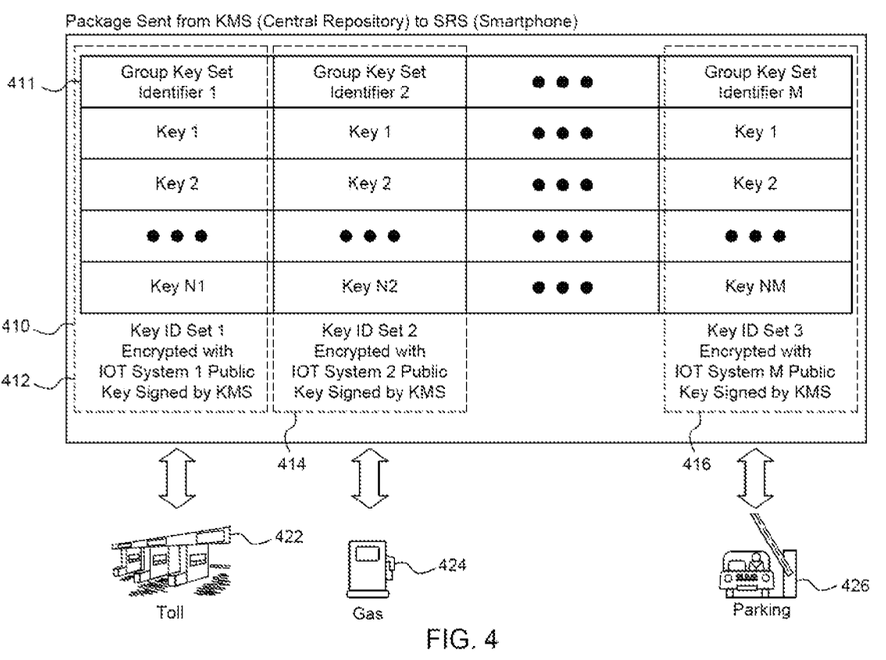
FIG. 4 illustrates a sample package of encryption keys coming from a key management system via the user's smartphone to IoT systems, according to the invention.

FIG. 4 illustrates a sample package of encryption keys coming from the key management system via a smartphone 230, 232, 234 to IoT systems. Shown is a plurality of keys sets 410, sent from backend system, central repository or key management system (KMS in FIG. 4) 110 to the smartphone 230. Each key set 412, 414, 416 in the plurality of key sets 410 includes encryption key 1 through key n. Each key set 412, 414, 416 may include a group key set identifier 411. For security and authentication, each key set 412, 414, 416 is encrypted with a public key of IoT system 420, which is delivered and signed by the backend system, central repository or key management system 110. Shown are three example IoT systems 422, 424 and 426.

Example Smartphone

Figure 5:
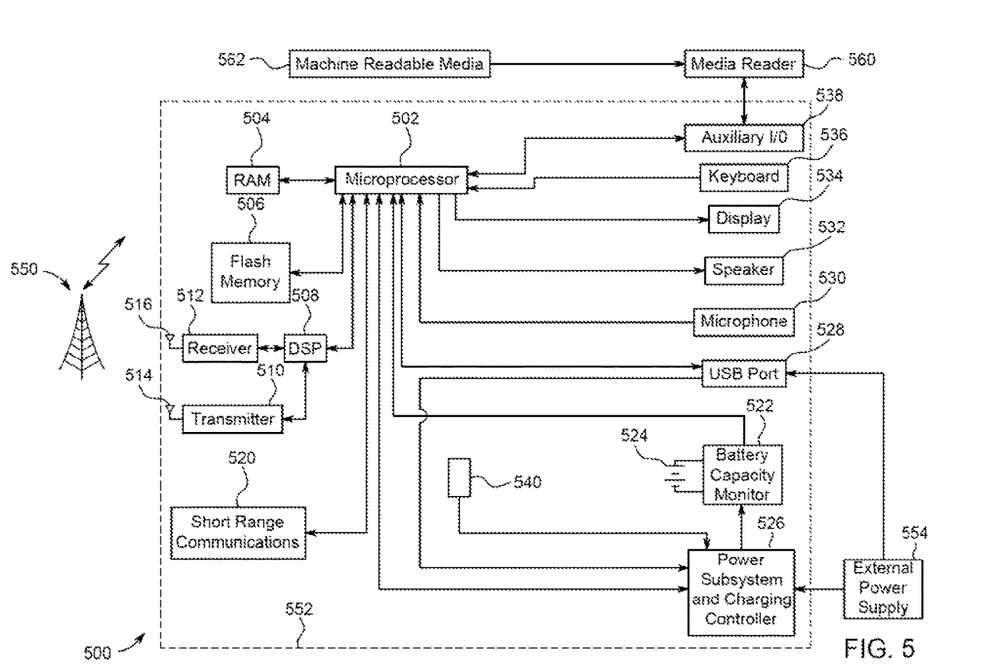
FIG. 5 is an example block diagram of the smartphone according to the invention.

FIG. 5 is a block diagram of an electronic device and associated components 500 in which the systems and methods disclosed herein may be implemented. The electronic device or smartphone 230, 552, in this example, is a wireless two-way communication device with one or more of the following: voice, text, and data communication capabilities. Such electronic devices communicate with a wireless voice, text, or data network 550 using a suitable wireless communications protocol. Wireless voice communications may be performed using either an analog or digital wireless communication channel. Data communications allow the electronic device or smartphone 230, 552 to communicate with other computer systems via the Internet. Examples of electronic devices that are able to incorporate the above-described systems and methods include, for example, a data messaging device, a two-way pager, a cellular telephone with text and data messaging capabilities, a wireless Internet appliance, or a data communication device that may or may not include telephony capabilities.

The illustrated electronic device or smartphone 230, 552 is an example electronic device that includes two-way wireless communications functions. Such electronic devices may incorporate communication system elements such as a wireless transmitter 510, a wireless receiver 512, and associated components such as one or more antenna elements 514 and 516. A digital signal processor (DSP) 508 performs processing to extract data from received wireless signals and to generate signals to be transmitted. The particular design of the communication system may be dependent upon the communication network and associated wireless communications protocols with which the device is intended to operate.

The electronic device or smartphone 230, 552 includes a microprocessor 502 that controls the overall operation of the electronic device or smartphone. The microprocessor 502 interacts with the above-described communications system elements and also interacts with other device systems. In various examples, the electronic device or smartphone 230, 552 is able to include one or more of various components such as a flash memory 506, random access memory (RAM) 504, auxiliary input/output (I/O) device 538, data port 528, display 534, keyboard 536, earpiece 532, audio sound reproduction system 570, microphone 530, a short-range communications system 520, a power system 522, other systems, or combinations of these.

One or more power storage or supply elements, such as a battery 524, are connected to a power system 522 to provide power to the circuits of the electronic device or smartphone 230, 552. The power system 522 includes power distribution circuitry for providing power to the electronic device or smartphone 230, 552 and also contains battery charging circuitry to manage recharging the battery 524 (or circuitry to replenish power to another power storage element). The power system 522 receives electrical power from external power supply 554. The power system 522 is able to be connected to the external power supply 554 through a dedicated external power connector (not shown) or through power connections within the data port 528. The power system 522 includes a battery monitoring circuit that is operable to provide a status of one or more battery status indicators, such as remaining capacity, temperature, voltage, electrical current consumption, and the like, to various components of the electronic device or smartphone 230, 552.

The data port 528 is able to support data communications between the electronic device or smartphone 230, 552 and other devices through various modes of data communications, such as high-speed data transfers over optical communications circuits. Data port 528 is able to support communications with, for example, an external computer or other devices. In some examples, the data port 528 is able to include electrical power connections to provide externally provided electrical power to the electronic device or smartphone 230, 552, deliver electrical power from the electronic device or smartphone to other externally connected devices, or both. Data port 528 of, for example, an electronic accessory is able to provide power to an electronic circuit, such as microprocessor 502, and support exchanging data between the microprocessor 502 and a remote electronic device that is connected through the data port 528.

Data communication through data port 528 enables the user to select preferences through the external device or through a software application and extends the capabilities of the device by enabling information or software exchange through direct connections between the electronic device or smartphone 230, 552 and external data sources rather than through a wireless data communication network. In addition to data communication, data port 528 provides power to the power system 522 to charge the battery 524 or to supply power to the electronic circuits, such as microprocessor 502, of the electronic device or smartphone 230, 552.

Operating system software used by the microprocessor 502 is stored in flash memory 506. Examples of flash memory 506 are able to include, for example, flash memory, magnetic-based storage devices, other volatile or non-volatile data store elements, or the like. Some examples are able to use flash memory 506 that includes a battery backed-up RAM or other non-volatile storage data elements to store operating systems, other executable programs, or both. The operating system software, device application software, or parts thereof, are able to be temporarily loaded into volatile data storage such as RAM 504. Data received through wireless communication signals or through wired communications are also able to be stored to RAM 504. The microprocessor 502 in some examples, are able to execute program components, such as is able to be defined in flash memory 506 in one example, that cause the microprocessor 502 to perform the above-described processes and methods.

The microprocessor 502, in addition to its operating system functions, is able to execute software applications on the electronic device or smartphone 230, 552. Applications that control basic device operations, including at least data and voice communication applications, can be installed on the electronic device or smartphone 230, 552 during manufacture. In an example, programs and other data used to support the processes described above are able to be installed in the memory of the electronic device or smartphone 230, 552. Further examples of applications that are able to be loaded onto the device may be a personal information manager (PIM) application having the ability to organize and manage data items relating to the user of the device, such as but not limited to, e-mail, calendar events, voice mails, appointments, and task items. The applications are able to include the above-described applications, which may be installed during manufacture or from another trusted and verified source, along with user applications that may be installed at any time.

Further applications may also be loaded onto the electronic device or smartphone 230, 552 through, for example, the wireless network 550, an auxiliary I/O device 538, data port 528, short-range communications system 520, or any combination of these interfaces. Such applications are then able to be installed by the user in the RAM 504 or a non-volatile store for execution by the microprocessor 502.

In a data communication mode, a received signal such as a text message or web page download is processed by the communication system, including a wireless receiver 512 and wireless transmitter 510, and communicated data is provided by the microprocessor 502, which is able to further process the received data. In some examples, the electronic device or smartphone 230, 552 includes a display, output ports, or combinations of these. In such examples, the received data is able to be processed for output to the display 534, or alternatively, to an auxiliary I/O device 538 or the data port 528. In examples of the electronic device or smartphone 230, 552 that include a keyboard 536 or other similar input facilities, the user of the electronic device or smartphone 230, 552 may also compose data items, such as e-mail messages, using the keyboard 536, which is able to include a complete alphanumeric keyboard or a telephone-type keypad, in conjunction with the display 534 and possibly an auxiliary I/O device 538. Such composed items are then able to be transmitted over a communication network through the communication system.

For voice communications, the overall operation of the electronic device or smartphone 230, 552 is substantially similar, except that received signals are generally provided to an earpiece 532, and signals for transmission are generally produced by a microphone 530. Alternative voice or audio I/O systems, such as a voice message recording system, may also be implemented on the electronic device or smartphone 230, 552. Although voice or audio signal output is generally accomplished primarily through the earpiece 532, in examples of electronic devices 552 that include a display 534, the display may also be used to provide an indication of the identity of a calling party, the duration of a voice call, or other voice call related information.

Depending on conditions or statuses of the electronic device or smartphone 230, 552, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 520 provides for data communication between the electronic device or smartphone 230, 552 and different systems or devices, which need not necessarily be similar devices. For example, the short-range communications system 520 includes an infrared device and associated circuits and components, or a radio frequency based communication module such as Bluetooth to provide for communication with similarly-enabled systems and devices, including the data file transfer communications described above. The short-range communications system is also able to include one or more of components to support communications over wireless links such as Wi-Fi, Zigbee, near-field communications, any other short-range link, or combinations of these.

A media reader 560 is able to be connected to an auxiliary I/O device 538 to allow, for example, loading computer readable program code of a computer program product into the electronic device or smartphone 230, 552 for storage into flash memory 506. One example of a media reader 560 is an optical drive such as a CD/DVD drive, which may be used to store data to and read data from a computer-readable medium or storage product such as computer-readable storage media 562. Examples of suitable computer-readable storage media include optical storage media such as a CD or DVD, magnetic media, or any other suitable data storage device. Media reader 560 is alternatively able to be connected to the electronic device through the data port 528, or computer-readable program code is alternatively able to be provided to the electronic device or smartphone 230, 552 through the wireless network 550.

Key Management System and/or Reading Equipment

Figure 6:
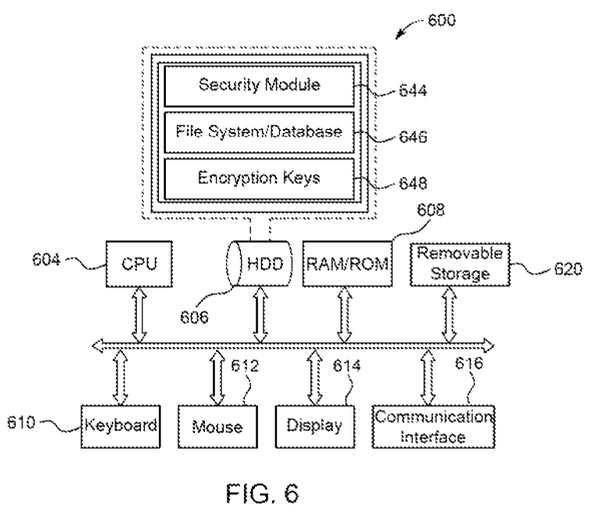
FIG. 6 illustrates a particularly configured network or host computer platform that may be used to implement the method on the key management system or on reading equipment, or on both, as shown in FIGS. 1-4, according to the invention.

FIG. 6 is a functional block diagram illustration of a computer hardware platform that can communicate with various networked components, according to one aspect of the present invention. In particular, FIG. 6 illustrates a particularly configured network or host computer platform 600, as may be used to implement the method on the key management system 110 or on the reading equipment 150, or on both, as shown in FIGS. 1-4. FIG. 6 can implement any or part of the key management system 110 and/or the reading equipment 150.

The computer platform 600 may include a central processing unit (CPU) 804, a hard disk drive (HDD) 606, random access memory (RAM) and/or read-only memory (ROM) 608, a keyboard 610, a mouse 612, a display 614, and a communication interface 616, which are connected to a system bus 602. The HDD 606 can include data stores.

In one embodiment, the HDD 606 has capabilities that include storing a program that can execute various processes, such as executing a security module 644 to provide encryption key services and digital signature services, in a manner described herein. A file system or database 646 may be used to keep track of encryption keys 648. Another portion of storage may hold the encryption keys themselves.

In one embodiment, a program, such as Apache™, can be stored for operating the system as a Web server. In one embodiment, the HDD 606 can store an executing application that includes one or more library software modules, such as those for the Java™ runtime environment program for realizing a Java virtual machine.

As will be appreciated by one skilled in the art, aspects of the present invention may be embodied as a system, method, or computer program product, such as a removable storage 620 at any possible technical detail level of integration. The computer program product may include a computer-readable storage medium (or media) having the computer-readable program instructions thereon for causing a processor to perform aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

NON-LIMITING EXAMPLES

The flowchart and block diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the present application has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application and to enable others of ordinary skill in the art to understand various embodiments of the present invention, with various modifications as are suited to the particular use contemplated.

What is claimed is:

1. A computer-implemented method on a wireless mobile device for distributing encryption keys to Internet of Things (IoT) systems, the method comprising:
    operating on a wireless mobile device with a location service, a first radio transceiver for cellular communications, and a second radio transceiver for exchanging data between one or more IoT systems and the wireless mobile device;
    requesting, with the first radio transceiver, one or more IoT systems keys from a key management system;
    receiving, with the first radio transceiver, the one or more IoT systems keys from the key management system, wherein each of the IoT systems keys is
        i) encrypted with a public key from at least one recipient IoT system, and
        ii) signed by the key management system;
    in response to the wireless mobile device being located in proximity to the at least one recipient IoT system, receiving with the second radio transceiver, one or more identifiers of the at least one recipient IoT system;
    selecting at least one of the IoT systems keys from the one or more IoT systems keys that corresponds to the one or more identifiers; and
    transmitting, with the second radio transceiver, the selected IoT system keys to the at least one recipient IoT system.

2. The computer-implemented method of claim 1, wherein requesting one or more IoT systems keys from a key management system, includes sending a location from the location service of the wireless mobile device.

3. The computer-implemented method of claim 1, wherein the one or more IoT systems keys include a start validity date/time field and an expiration date/time field.

4. The computer-implemented method of claim 1, wherein the one or more IoT systems keys are symmetrical keys, asymmetric keys, or a combination of both.

5. The computer-implemented method of claim 1, wherein a location of a user, a location of a vehicle, or a combination thereof, is used to identify the at least one recipient IoT system.

6. The computer-implemented method of claim 5, wherein the at least one recipient IoT system is one of a toll booth, a parking area, a gas pump, a restaurant, or a combination thereof.

7. The computer-implemented method of claim 1, wherein the receiving, with the first radio transceiver, the requested IoT systems keys from the key management system includes a group identifier and wherein the selecting, on the wireless mobile device, of the at least one of the IoT systems keys includes selecting using the group identifier.

8. The computer-implemented method of claim 7, wherein the group identifier logically categorizes encryption keys based on geographic location of the at least one recipient IoT system, a type of service, expiration dates, or a combination thereof.

9. A wireless mobile device for distributing encryption keys to Internet of Things (IoT), comprising:
    a location service, a first radio transceiver for cellular communications, and a second radio transceiver for exchanging data between one or more IoT systems and the wireless mobile device;
    a processor device; and
    a memory operably coupled to the processor device and storing computer-executable instructions causing:
        requesting, with the first radio transceiver, one or more IoT systems keys from a key management system;
        receiving, with the first radio transceiver, the one or more IoT systems keys from the key management system, wherein each of the IoT systems keys is
            i) encrypted with a public key from at least one recipient IoT system, and
            ii) signed by the key management system;
        in response to the wireless mobile device being located in proximity to the at least one recipient IoT system, receiving with the second radio transceiver, one or more identifiers of the at least one recipient IoT system;
        selecting at least one of the IoT systems keys from the one or more IoT systems keys that corresponds to the one or more identifiers; and
        transmitting, with the second radio transceiver, the selected IoT system keys to the at least one recipient IoT system.

10. The wireless mobile device of claim 9, wherein requesting one or more IoT systems keys from the key management system, includes sending a location from the location service of the wireless mobile device.

11. The wireless mobile device of claim 9, wherein the one or more IoT systems keys include a start validity date/time field and an expiration date/time field.

12. The wireless mobile device of claim 9, wherein the one or more IoT systems keys are symmetrical keys, asymmetric keys, or a combination of both.

13. The wireless mobile device of claim 9, wherein a location of a user, a location of a vehicle, or a combination thereof, is used to identify the at least one recipient IoT system.

14. The wireless mobile device of claim 13, wherein the at least one recipient IoT system is one of a toll booth, a parking area, a gas pump, a restaurant, or a combination thereof.

15. The wireless mobile device of claim 9, wherein the receiving, with the first radio transceiver, the requested IoT systems keys from the key management system includes a group identifier and wherein the selecting, on the wireless mobile device, of the at least one of the IoT systems keys includes selecting using the group identifier.

16. The wireless mobile device of claim 15, wherein the group identifier logically categorizes encryption keys based on geographic location of the at least one recipient IoT system, a type of service, expiration dates, or a combination thereof.

* * * * *